A. C. WOOD.
LIGHT PROJECTION REGULATING MEANS.
APPLICATION FILED DEC. 31, 1919.

1,437,124.

Patented Nov. 28, 1922.

Inventor
Arthur C. Wood,

By Etienne Talbert
Attorney

A. C. WOOD.
LIGHT PROJECTION REGULATING MEANS.
APPLICATION FILED DEC. 31, 1919.

1,437,124.

Patented Nov. 28, 1922.
2 SHEETS—SHEET 2.

Inventor
Arthur C. Wood,

By
Attorney

Patented Nov. 28, 1922.

1,437,124

UNITED STATES PATENT OFFICE.

ARTHUR CHARLES WOOD, OF MANSFIELD, OHIO, ASSIGNOR, BY MESNE ASSIGNMENTS, TO THE MANSFIELD LAMP AND MANUFACTURING COMPANY.

LIGHT-PROJECTION REGULATING MEANS.

Application filed December 31, 1919. Serial No. 348,516.

*To all whom it may concern:*

Be it known that ARTHUR CHARLES WOOD, a subject of Great Britain, residing at Mansfield, in the county of Richland and State of Ohio, has invented new and useful Improvements in Light-Projection Regulating Means, of which the following is a specification.

The object of the invention is to provide means for regulating and directing the projection of the rays of light projected from automobile and similar lamps to avoid the traffic objections incident to the glare of the lights of one machine interfering with the vision of the driver of a machine approaching in the opposite direction, the purpose being, with the minimum modification in the ordinary construction of automobile lamps to make it possible for the driver of a vehicle to change the direction of and also vary the diffusion of the rays of light without entirely excluding the same or rendering it ineffective as a means of enabling him to properly direct the movements of his own machine, and therefore the invention consists in a lamp having a hinged reflector, with means for tilting the reflector without affecting or moving the light source, to thereby change and regulate the direction of light rays projected from such light source without dimming or otherwise directly affecting the light rays from such source.

In the drawings:

Figure 7 is a central sectional view similar to Figure 1 but showing a modification of the invention.

Figure 1:
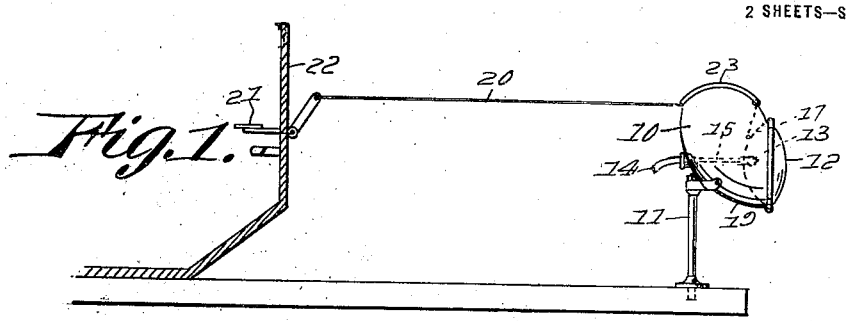
Figure 1 is a general view showing a head-light lamp in operative position on the frame of an automobile or similar vehicle together with means whereby the operation of dimming or reducing the intensity of the light may be effected from the dashboard or devices located within convenient reach of the driver or operator of the machine.

In the illustrated embodiment of the invention the lamp casing 10, supported by the usual bracket 11 is provided with the lens 12 located centrally in front of the lamp 13 which may be of the electric type ordinarily employed and to which the conductors 14 from the battery or other source of energy are extended through a tube 15 supported at its inner end by an upright or brace 16, or the equivalent thereof. Located within the casing is a reflector 17 hinged as at 18 to the casing for swinging movement into and out of operative relation with the bulb 13 and lens 12, the same being shown in its operative position in full lines and in its inoperative position in dotted lines in Figure 2, the rear wall 19 of the casing preferably being arranged concentric with the hinge 18 to afford clearance for the free edge of the reflector without necessitating an unnecessarily large cubical capacity of the casing.

Various means may be employed for effecting the movement of the reflector from one position to another, such as an operating wire or cord 20 extended from a foot pedal 21 mounted near the dashboard 22 of the vehicle as indicated in Figure 1, or within reach of the foot of the driver of the car, said wire or cord being extended through a guide tube 23 on the casing and over a direction pulley 24 and being attached as by means of an eye 25 to the reflector. By having the reflector hinged at its upper edge it is obvious that the weight thereof will serve to return the latter to its normal position when released after movement to the inoperative or dotted line position indicated in Figure 2, but as a means of fortifying the action of gravity and affording a more certain and prompt return of the same to its normal position a spring 26 shown in detail in Figure 3 may be employed in connection with the pivot 27.

Figure 2:
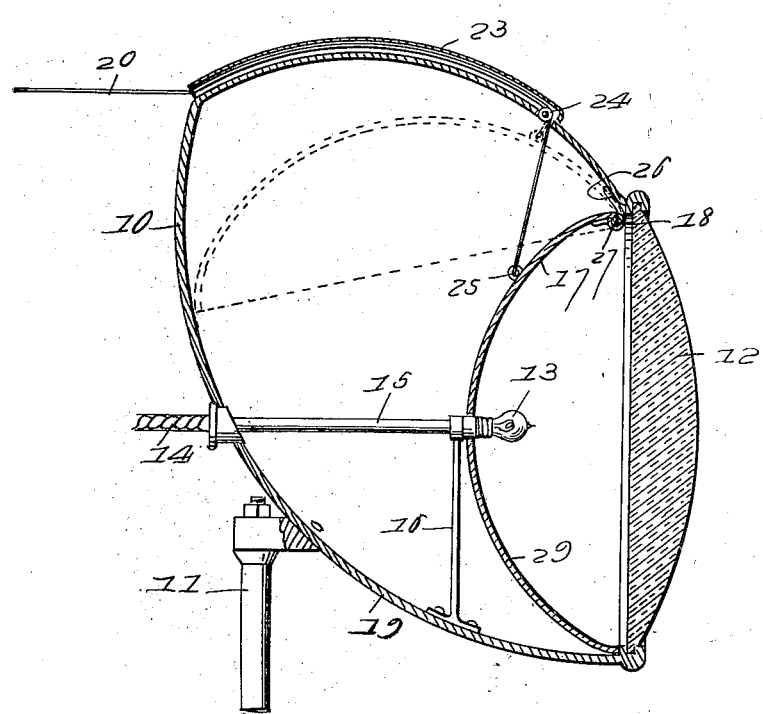
Figure 2 is a central sectional view of the lamp showing in full lines the normal and in dotted lines the adjusted position of the movable reflector.
Figure 1:
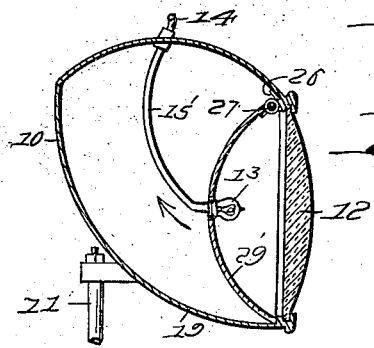
Figure 3:
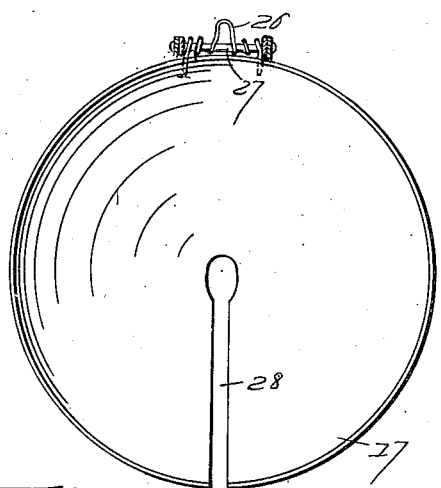
Figure 3 is a face view of the reflector.
Figure 4:
Figure 4 is a horizontal sectional view of a portion of the reflector in its normal position.
Figure 6:
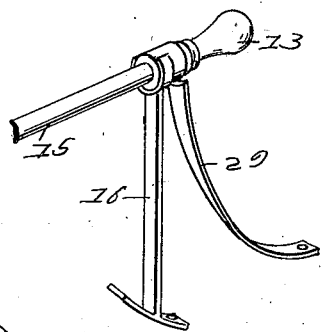
Figure 6 is a detail view of the stationary or permanent section of the reflector and the related parts of the structure with which it cooperates.
Figure 5:
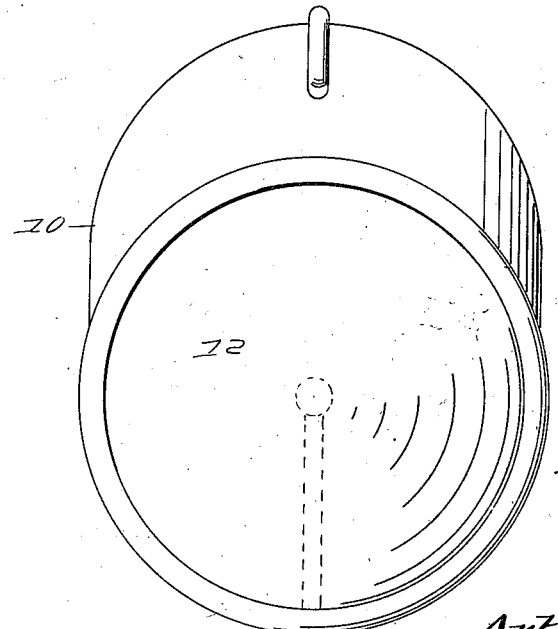
Figure 5 is a front view of the lamp.

Also in order that the reflector may clear the lamp supporting tube 15 and brace 16 or other interior obstructions in the casing it may be provided with a slot 28 shown clearly in Figure 3 and to supplement the reflecting surface thus removed from the body portion of the reflector, to the end that an unbroken shaft of light may be projected therefrom when in its normal position a supplemental reflector section 29 may be permanently located in the casing in front of the brace 16 and in the plane of the body portion of the reflector when the latter is in its normal position, to fit in and close the slot 28 as indicated in Figures 2 and 5 and in detail in Figure 4, the edges of the body portion of the reflector at opposite sides of the slot being flanged as at 30 for contact with the stationary reflector section.

It will be understood that upon approaching a vehicle moving in the opposite direction, when it is desired to change the direction of the projection of the rays of the light ordinarily projected by the reflector it is simply necessary to actuate the pedal 21 or equivalent operating means to displace or move the reflector to a position out of registration with the lens 12 so that the light from the lamp is diffused rather than projected in an intense shaft or column, and it will furthermore be obvious that by mounting the reflector to swing in a vertical plane, the axis of movement being at the upper edge of the reflector, the deflection or movement of the latter from its normal position will serve to project the light downwardly and diffuse the same at a more or less abrupt angle rather than directly forward as when the reflector is in its normal position, so that while the adjustment is effective in removing from the eyes of the driver of an approaching car the glare which is found objectionable and is prohibited in many localities by the traffic rules and regulations, the light is directed downwardly upon the roadway in the path of the car equipped with the device for the benefit of the driver of said car in directing his machine. In other words the movement of the reflector from its normal position serves to reduce the range of the reflected shaft of light and concentrate it upon the roadway within an area close to and immediately in front of the vehicle for the benefit of the driver of said vehicle while obviating the objection to the light as ordinarily projected, so far as the convenience of the driver of an approaching vehicle is concerned.

Referring to Fig. 7 reference numeral 15′ refers to a hollow curved bracket for supporting the electric globe 13 through which the electric wire 14 passes to conduct an electric current to the light globe.

What is claimed is:

1. A lamp for the purpose indicated having a hinged reflector slotted to afford clearance for obstructions in the path of movement thereof in combination with a stationary reflector section arranged in the plane occupied by the reflector when in its normal position for supplementing the reflecting surface thereof.

2. A lamp for the purpose indicated having a casing provided with a front lens and a bulb support located in rear thereof, a reflector pivotally mounted in a plane adjacent to the lens for swinging movement in a path intersecting the bulb support and provided with a slot affording clearance for said support, and a supplemental reflector section corresponding in dimensions with the slot in said reflector and occupying a position in the normal plane of the latter for reception by the slot thereof.

3. A motor car lamp, a fixed bracket, an electric globe secured thereto at its free end, a casing, a unitary tiltable reflector hinged at the top to the casing, axially arranged with respect to the globe and adapted to swing over and around the bracket as it is tilted as, and for the purpose described.

4. A motor car lamp, means to support a fixed source of light, an electric globe secured thereto, a unitary tiltable reflector hinged at the top, axially arranged with respect to the globe and movable above and below the light source and over and around the bracket thereby changing the direction of some of the reflected rays of light to a greater extent than other such rays, whereby to vary the intensity of the light on the road bed.

In testimony whereof he affixes his signature.

ARTHUR CHARLES WOOD.